United States Patent Office 3,357,529
Patented Dec. 12, 1967

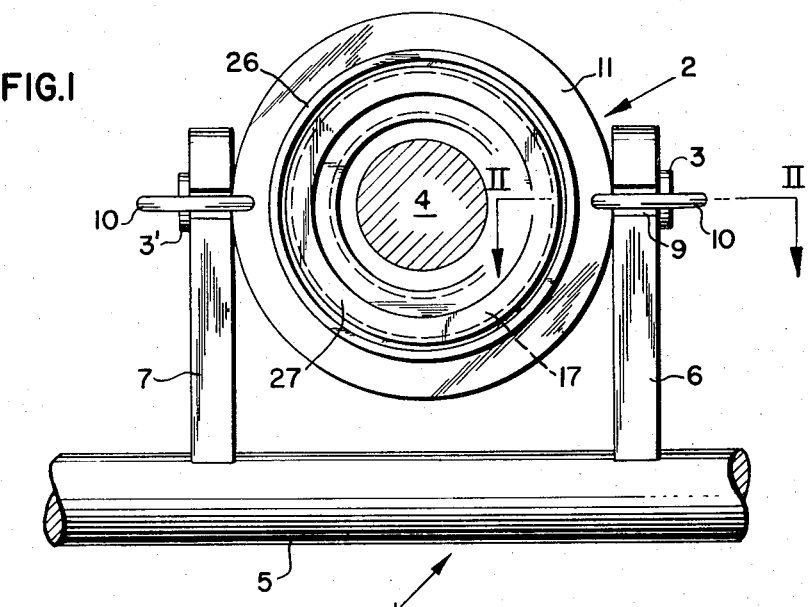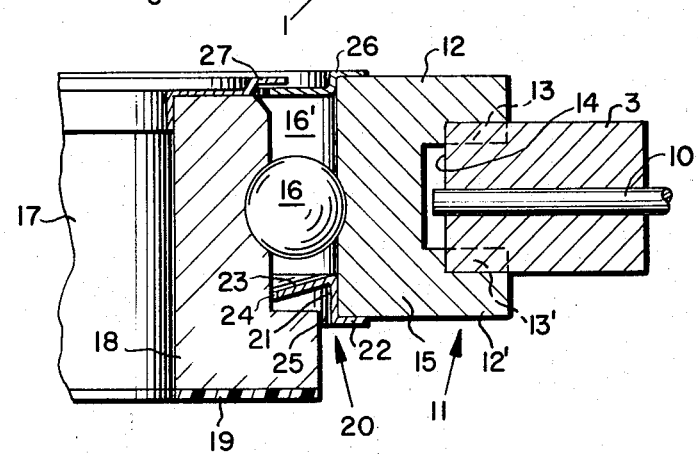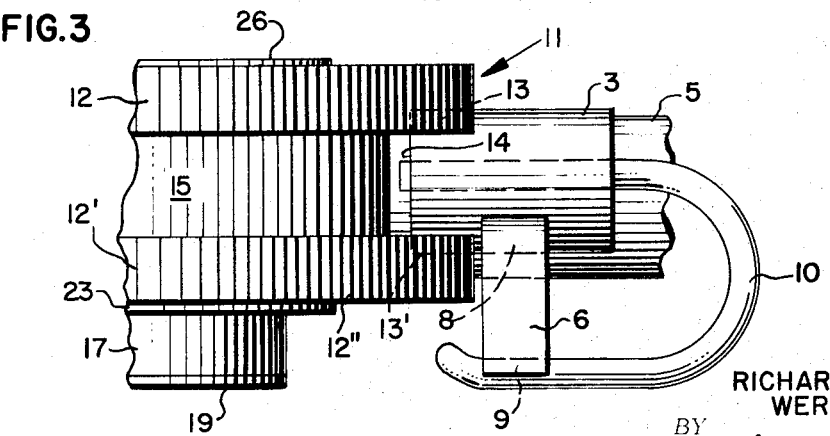

3,357,529
CLUTCH RELEASE BEARING ASSEMBLY
Richard Binder and Werner Herold, Schweinfurt (Main), Germany, assignors to Fichtel & Sachs A.G., Schweinfurt (Main), Germany
Filed Jan. 17, 1967, Ser. No. 609,832
Claims priority, application Germany, Nov. 24, 1962, F 38,385
9 Claims. (Cl. 192—98)

ABSTRACT OF THE DISCLOSURE

A clutch release bearing assembly mainly consisting of a fork, of a ball bearing, and of pins on the bearing which connect the bearing to the fork. The inner ring of the bearing projects axially beyond the outer bearing ring and carries a flat disc of thermoplastic resin composition for engagement with the releasing mechanism of the clutch, the outer ring being a channel whose outwardly directed flanges receive the pins therebetween.

Cross reference to related application

This application is a continuation-in-part of our co-pending application, Ser. No. 325,007, filed on Nov. 20, 1963 and now abandoned.

Background of the invention

This invention is an improvement over the clutch disengaging bearing disclosed and claimed by one of us in United States Patent No. 2,725,965, in which a thrust ring mounted on the inner ring of a ball bearing engages the release mechanism of an automotive friction clutch when a clutch release fork diametrically opposite pins on the outer bearing ring to move the bearing axially along the output shaft of the clutch.

The useful life of a bearing of the described type is determined to a significant extent by the frictional wear of the thrust ring which normally stands still when it engages the clutch release mechanism while the latter rotates at the speed of the engine crankshaft. The nature of the thrust ring material is an important factor in the wear resistance of the latter. Another important factor is the inert mass of the rotating bearing portion. The higher this mass, the longer the acceleration period during which there is relative motion between the thrust ring and the clutch mechanism proper. Yet another factor is the temperature reached by the thrust ring during the acceleration period. While different materials of construction differ in their heat sensitivity, as a general rule, the rate of wear increases with increasing temperature.

The thrust ring of the earlier patent is necessarily a relatively heavy piece of material which is only loosely connected to the inner bearing ring and does not derive significant mechanical support from the bearing ring. Moreover, it is connected to the inner bearing ring by a thin sheet metal sleeve only, so that there is no significant thermal contact between the thrust ring and the main mass of the bearing assembly which could absorb and dissipate the heat generated by friction between the thrust ring and the clutch mechanism.

The choice of materials for the thrust ring is thus somewhat limited. The polymers of fluorocarbons, such as tetrafluoroethylene or trifluoromonochloroethylene, which have extremely low coefficients of friction in contact with metal are commonly employed as anti-friction coatings. Such coatings cannot be used in the known disengaging bearing on the thrust ring because of their thermoplastic nature. If they are not backed by a very heavy metallic thrust ring, the frictionally generated heat is sufficient to soften the plastic and to cause its rapid wear. If they are backed by a heavy thrust ring, the period of acceleration is so long that the rate of wear again is disappointingly high.

Summary of the invention

The object of the invention is the provision of an improved clutch release bearing assembly which provides the known advantages of fluorocarbon polymers as a coating for the engaging surface of the rotatable bearing portion, yet avoids the shortcomings of the known device which almost completely balance the advantages gained by the use of thermoplastic synthetic resin compositions.

The ball bearing used in the clutch release bearing assembly of this invention is of a commercially available type in which the inner bearing ring projects axially beyond the outer bearing ring, and the projecting portion of the inner ring has a radial face. We have found that a low-friction coating or facing of thermoplastic resin composition may be adhesively secured directly to the radial face of the inner bearing ring for engagement with the clutch mechanism, thereby overcoming all the shortcomings of the earlier device outlined above. The coating, and the bearing as a whole, has a very long useful life.

We have also found that the pins which connect the bearings with the release fork can be attached to the bearing in a particularly simple and effective manner if the outer bearing ring is an outwardly open U-shaped channel, thus permitting the pins to be installed between the flanges of the channel without significantly weakening the outer bearing ring.

Brief description of the drawing

Other features, additional objects, and many of the attendant advantages of this invention will become readily apparent from reference to the following detailed description of a preferred embodiment when considered in connection with the appended drawing in which:

FIG. 1 shows a clutch release bearing assembly of the invention in rear elevation, and the associated clutch output shaft in corresponding radial section;

FIG. 2 shows a portion of the apparatus of FIG. 1 in section on the line II—II and on a larger scale; and FIG. 3 is a partial top plan view of the apparatus of FIG. 1 corresponding to FIG. 2.

Description of the preferred embodiment

The clutch release bearing assembly of the invention consists mainly of a fork 1, a ball bearing 2, and of two cylindrical pins 3, 3' which pivotally connect the fork to the bearing. The output shaft 4 of an associated friction clutch, not otherwise shown, passes approximately coaxially through the central opening in the bearing 2.

The fork 1, conventional in itself, has a shaft 5 from which two radial arms 6, 7 project in a common plane. The free end of each arm has an approximately semi-cylindrical transverse groove 8 in one longitudinal face and a narrower transverse notch 9 in the opposite longitudinal face. The pins 3, 3' are respectively received in the grooves 8 in conforming slidable engagement.

As shown in greater detail in FIG. 3 for one side of the assembly, an approximately U-shaped clip 10 of heavy steel wire holds the pin 3 in the associated groove 8. One leg of the clip freely passes through an axial bore in the pin, and the other leg is received in the notch 9 and its free end, which projects beyond the arm 6, is bent toward the pin 3 to prevent the clip 10 from slipping from its illustrated position.

The outer bearing ring 11 of the ball bearing 2 is a channel of hardened carbon steel whose flanges 12, 12' are directed radially outward. The annular axially opposite faces of the flanges 12, 12' are provided with two pairs of shallow recesses 13, 13', only one pair being indicated in FIGS. 2 and 3, the other pair being on the diametrically opposite side of the bearing. The recesses 13, 13' have a greatest axial depth which is not quite one half of the flange thickness and extend over only a portion of the radial width of the flange.

The pin 3 is conformingly received in the recesses 13, 13' and secured therein by the resiliency of the flanges 12, 12', that is, by a shrink fit. A transverse end face 14 of the pin 3 is radially spaced from the web 15 of the outer bearing ring 11, and the clip 10 is limited in its movement inward of the bearing by abutment of one of its legs against the web 15 in the space adjacent the transverse pin face 14.

Bearing balls 16, of which only one is shown in FIG. 2, are interposed between the inner face of the web 15 and a radially opposite outer face of an inner bearing ring 17, the two faces being slightly grooved so that the bearing balls 16 prevent relative axial displacement of the rings 11, 17. The inner bearing ring 17 is of L-shaped cross section, the shorter arm of the L-shape being formed by an annular flange 18 which projects radially outward from the main portion of the inner ring 17 and extends axially beyond the outer bearing ring 11. The outer radial end face of the flange 18 is covered with an adhesively secured, flat, annular disc 19 of polytetrafluoroethylene (Teflon).

The narrow gap between the flange 18 and the web 15 of the outer bearing ring is partly obstructed by a sealing ring 20 of resilient sheet metal. The ring 20 has a cylindrical portion 21 which is held in abutting engagement with the inner face of the web 15 by the resiliency of the ring. An outer, flat, annular portion 22 of the ring 20 hugs the outer face of the flange 12' of the bearing ring 11, and an approximately conical portion 23 of the ring 20 obstructs the radial width of the bearing space 16' between the opposite, axially coextensive, faces of the rings 11, 17 except for a narrow annular gap 24 which is axially and radially offset from gap 25 between the flange 18 and the cylindrical sealing ring portion 21. The portions of the ring 20 and of the inner bearing ring 17 which jointly define the gaps 24, 25 thus provide a labyrinth seal which prevents the escape of lubricant (not shown) from one axial end of the ball bearing space 16' and, even more importantly, prevent entry of contaminants into the space 16'.

The radial end faces of the bearing rings 11, 17 at the other axial end of the bearing space 16' are axially offset, the outer ring 11 projecting slightly beyond the inner ring 17. Another labyrinth seal is formed by two sealing rings 26, 27 somewhat similar in structure to the ring 20 and respectively fastened to the bearing rings 11, 17 by abutting engagement of respective cylindrical portions of the sealing rings with inwardly directed cylindrical faces of the bearing rings under the resilient force of the rings.

The afore-described clutch release bearing assembly is operated in a conventional manner, the fork 1 being normally pivotally mounted in an automotive vehicle and connected to the clutch pedal of the vehicle in such a manner that the shaft 5 is turned, and the ball bearing 2 is shifted axially away from the viewer in FIG. 1 toward the non-illustrated clutch when the pedal is depressed. The flat disc 19 engages a metal element of the clutch which causes the clutch to be released.

At the moment of engagement, the clutch element normally rotates at the speed of the engine crankshaft whereas the inner bearing ring 17 stands still or rotates at a lower speed. Frictional heat is developed at the surface of the disc 19 even though the coefficient of friction between polytetrafluoroethylene and metals, particularly steel, is very low. Because the axial thickness of the plastic disc 19 is extremely small, typically less than one tenth of its radial width, and because it is in face-to-face thermal contact with the flange 18, the metal of the inner bearing ring 17 serves as a heat sink which absorbs and dissipates the heat of friction fast enough to prevent softening and deformation of the thermoplastic resin composition of the disc 19 under any condition of operation.

The success of this arrangement depends also in part on the low inertia of the inner bearing ring 17 and of the single sealing ring 27 which is attached thereto. The ring 17 is quickly accelerated by frictional engagement between the plastic disc 19 and the non-illustrated cooperating clutch elements, such as toggle levers or a diaphragm spring, or a washer or like motion transmitting element interposed between the disengaging bearing assembly and the toggle levers or the diaphragm spring in a conventional manner. The combined inert mass of all rotating elements of the clutch release bearing assembly is not significantly greater than that of the inner ring of the ball bearing alone.

The shallow recesses 13 each extend over approximately 60° of the circumference of the pins 3, 3'. They receive only about 1/10 to 1/20 of the circular cross section of the pin. Yet, this shallow engagement of the pins by the flanges 12, 12' is sufficient for transmiting the clutch releasing pressure of the non-illustrated clutch pedal to the toggle levers or the diaphragm spring of the clutch. The transmitted force is normally of the order of 100–500 lbs., but the principal component of the clutch releasing force is transmitted between the pins 3, 3' and the forward flange 12' of the outer bearing ring in the direction of the clutch axis. The component which could cause relative displacement of the pins 3, 3' is readily withstood by the illustrated arrangement because of the high rigidity of the channel 11 when considered relative to its weight or mass.

The pins 3, 3', of course, may be additionally secured to the flanges 12, 12', if so desired, by soldering or other procedures which do not affect the temper of the outer bearing ring 11, but the illustrated shrink fit is normally sufficient.

It should be understood, of course, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. A clutch release bearing assembly comprising, in combination:
   (a) an inner bearing ring having an axis;
   (b) an outer bearing ring coaxially surrounding said inner ring, respective portions of said rings being axially coextensive and defining an annular bearing space therebetween;
   (c) a plurality of bearing balls in said space, each bearing ball engaging respective radial recesses of said rings for securing the rings against relative axial displacement,
      (1) an integral portion of said inner bearing ring projecting axially beyond said outer bearing ring and having an annular end face transverse of said axis;
   (d) a flat annular disc of thermoplastic synthetic resin composition secured to said end face in face-to-face thermal contact, the axial thickness of said disc being but a small fraction of the radial width thereof;
   (e) two pin members fastened to respective diametrically opposite portions of said outer bearing ring and projecting therefrom in a radially outward direction; and
   (f) clutch release fork means including two arms respectively engaging said pin members for axially moving said outer bearing ring.

2. An assembly as set forth in claim 1, wherein said resin is a polyfluorocarbon, said thickness is not more than one tenth of said radial width, and said inner bearing ring is a unitary metal body.

3. An assembly as set forth in claim 1, wherein the radial thickness of said projecting portion of said inner ring is substantially greater than the radial thickness of said axially coextensive portion of the inner ring, and said projecting portion axially bounds said space.

4. An assembly as set forth in claim 3, further comprising a sealing ring member secured to an axially terminal portion of said outer bearing ring contiguously adjacent said space, said sealing ring member extending radially in said space toward said inner ring to define a first narrow annular gap with said coextensive portion of said inner ring, said projecting portion of said inner ring and said terminal portion of said outer ring jointly defining a second narrow annular gap axially and radially offset from said first gap, said gaps being spaced from said bearing balls in the same axial direction.

5. An assembly as set forth in clam 4, further comprising a second sealing ring member and a third sealing ring member axially spaced from said bearing balls in a direction away from said first and second gaps and defining therebetween a third narrow annular gap, said second and third ring members respectively being secured to said outer and inner rings in sealing engagement.

6. An assembly as set forth in claim 5, wherein said sealing ring members are of resilient material, and each sealing ring member has a substantially cylindrical portion abuttingly engaging a substantially cylindrical face of one of said rings under the resilient pressure of the sealing ring member for securing the sealing ring member to the corresponding bearing ring.

7. An assembly as set forth in claim 1, wherein said outer bearing ring is a channel member having an axially extending web portion and two axially spaced flange portions extending from said web portion in a radially outward direction, said pin members being partly received between said flange portions, and fixedly secured thereto.

8. An assembly as set forth in claim 7, wherein said pin members are substantially cylindrical and said flange portions are formed with shallow recesses respectively conformingly receiving parts of said pin members.

9. An assembly as set forth in claim 8, wherein the cross section of the part of each pin member received in one of said shallow recesses is not more than one tenth of the cross section of the pin member.

References Cited

UNITED STATES PATENTS

| | | | |
|---|---|---|---|
| 1,215,779 | 2/1917 | Conklin | 192—110 X |
| 2,071,245 | 2/1937 | Zarb | 192—110 X |
| 2,725,965 | 12/1955 | Binder | 192—98 |
| 3,241,643 | 3/1966 | Montgomery | 192—98 |

BENJAMIN W. WYCHE III, *Primary Examiner.*